United States Patent

Dummermuth

[15] 3,701,890

[45] Oct. 31, 1972

[54] DIGITAL DIFFERENTIAL ANALYZER EMPLOYING MULTIPLE OVERFLOW BITS

[72] Inventor: Ernst Dummermuth, East Cleveland, Ohio

[73] Assignee: Allen-Bradley Company, Milwaukee, Wis.

[22] Filed: Dec. 8, 1970

[21] Appl. No.: 96,120

[52] U.S. Cl. .........235/150.31, 235/151.11, 318/573

[51] Int. Cl. ...........................G05b 19/18, G06j 1/02

[58] Field of Search ....235/150.31, 151.11, 151.11 I, 235/150.3, 151, 152, 151.1; 318/573

[56] References Cited

UNITED STATES PATENTS

| | | | |
|---|---|---|---|
| 3,231,726 | 1/1966 | Williamson | 235/150.31 UX |
| 3,586,837 | 6/1971 | Hyatt | 235/150.31 |
| 3,598,974 | 2/1971 | Lincoln | 235/150.31 |
| 3,486,012 | 12/1969 | Burnett et al. | 235/151.11 |
| 3,254,203 | 5/1966 | Kueim | 235/151.11 X |
| 3,506,812 | 4/1970 | Rosener | 235/151.11 X |
| 3,050,251 | 8/1962 | Steele | 235/150.31 X |

*Primary Examiner*—Joseph F. Ruggiero
*Attorney*—Lindenberg, Freilich & Wasserman

[57] ABSTRACT

An arrangement for increasing the frequency of the occurrence of overflow from a digital differential integrator (DDI) is provided by deriving multiple bits in the form of a binary number from the most significant bit section of the accumulator register of the digital differential integrator.

12 Claims, 7 Drawing Figures

PATENTED OCT 31 1972 3,701,890

SHEET 1 OF 3

INVENTOR
ERNST DUMMERMUTH
BY Ludwig, Friedrich & Wasserman
ATTORNEYS

INVENTOR
ERNST DUMMERMUTH
BY Lindenberg, Freilich & Wasserman
ATTORNEYS

INVENTOR
ERNST DUMMERMUTH
BY Lindenberg, Freilich & Wasserman
ATTORNEYS

DIGITAL DIFFERENTIAL ANALYZER EMPLOYING MULTIPLE OVERFLOW BITS

BACKGROUND OF THE INVENTION

1. Field of the Invention

This invention relates to digital differential analyzer circuits and, more particularly, to improvements therein.

2. Description of the Prior Art

The digital differential integrator (hereafter called the DDI) has been used to convert numerical data into pulse trains wherein the number of pulses equal the number introduced into the integrand of the DDI. Thus, if the number placed in the integrand is $X$, $X$ pulses are generated. The way this is done, employing binary arithmetic for example, the number $X$ is first introduced into the integrand register. Assuming that both the integrand and accumulator registers are $n$ bits long then the number in the integrand is added to the accumulator $2^n$ times. During those $2^n$ addition cycles, the accumulator register overflows $X$ times.

This fact is easily verified by considering that $X$ is essentially multiplied by $2^n$ using repetitive addition. Since only the overflow pulses are considered as output, the accumulator looks like a divide by $2^n$. Therefore, $(X \cdot 2^n)/2^n = X$ and $\Delta t = 1/2^n$ If three of these DDI's are connected in parallel and if the integrands are loaded with the departure command numbers X, Y and Z, in a numerical control machine tool system, then $2^n$ addition cycles will generate pulse trains containing X, Y and Z pulses respectively.

The operation of the DDI's here are essentially that of a binary rate multiplier having output for three simultaneous axes. However, for a rate multiplier the output frequency is always less than the input frequency whereas for the DDI the output frequency is always less than the iteration frequency.

OBJECTS AND SUMMARY OF THE INVENTION

An object of this invention is to provide an arrangement for a DDI wherein its effective output overflow rate may exceed the maximum input rate.

Another object of the present invention is to provide an arrangement for operating a DDI wherein one can select an output overflow rate which is a desired multiple of the input iteration frequency rate.

Still another object of the present invention is to provide an arrangement for a numerical control system employing a DDI wherein the velocity for any choice of the values of the X, Y and Z motion commands is not limited by the input clock rate.

These and other objects of the invention are achieved in an arrangement wherein overflow from the DDI is obtained by selecting two or more of the most significant bits in the accumulator register at the end of an iteration cycle. The number of most significant bits selected determines the velocity gain of the system. The binary number obtained by this selection from the most significant bit portion of the register can be used in digital form, for example, in combination with the number in a following error register of a numerical control system for controlling numerical machine tool movement. Alternatively, the number derived from the accumulator may be quickly converted to pulses, or, it may be converted to an analog form for subsequent use.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
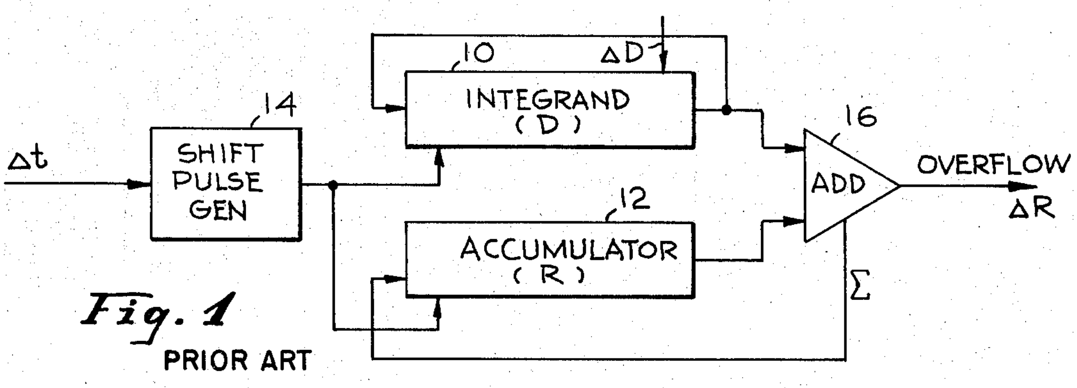
Fig. 1 PRIOR ART
FIG. 1 illustrates a schematic diagram of a DDI, shown for the purpose of illustrating the difference between the prior art and this invention.

Referring now to FIG. 1 there may be seen a block schematic diagram of a presently known DDI, which is shown to provide an appreciation for the difference provided by this invention. The DDI includes an integrand register 10 and an accumulator register 12. The integrand register is loaded with a binary number. It is assumed that both the accumulator and integrand registers are $n$ bits long. An iteration signal $\Delta t$ is applied to a shift pulse generator 14. In response the shift pulse generator applies pulses to the integrand and accumulator registers causing them to shift out their contents through the least significant bit end of the registers into an adder 16. The contents of the integrand are also circulated back through the most significant bit position. The sum output of the adder 16 is entered into the accumulator 12 through the most significant bit location. The overflow pulses ($\Delta$R) constitute the output of the accumulator. $2^n$ input pulses $\Delta$t are applied to the shift pulse generator so that the integrand register's contents are added $2^n$ times. The sum is provided in the accumulator. In the course of this addition, there will be provided a number of overflow pulses which equals the value of the number initially inserted into the integrand. The output frequency of the DDI used as a rate multiplier is always less than the input frequency and is a maximum if the integrand contains all 1's. Thus, the DDI may be said to operate with a gain of less than 1.

Figure 2:
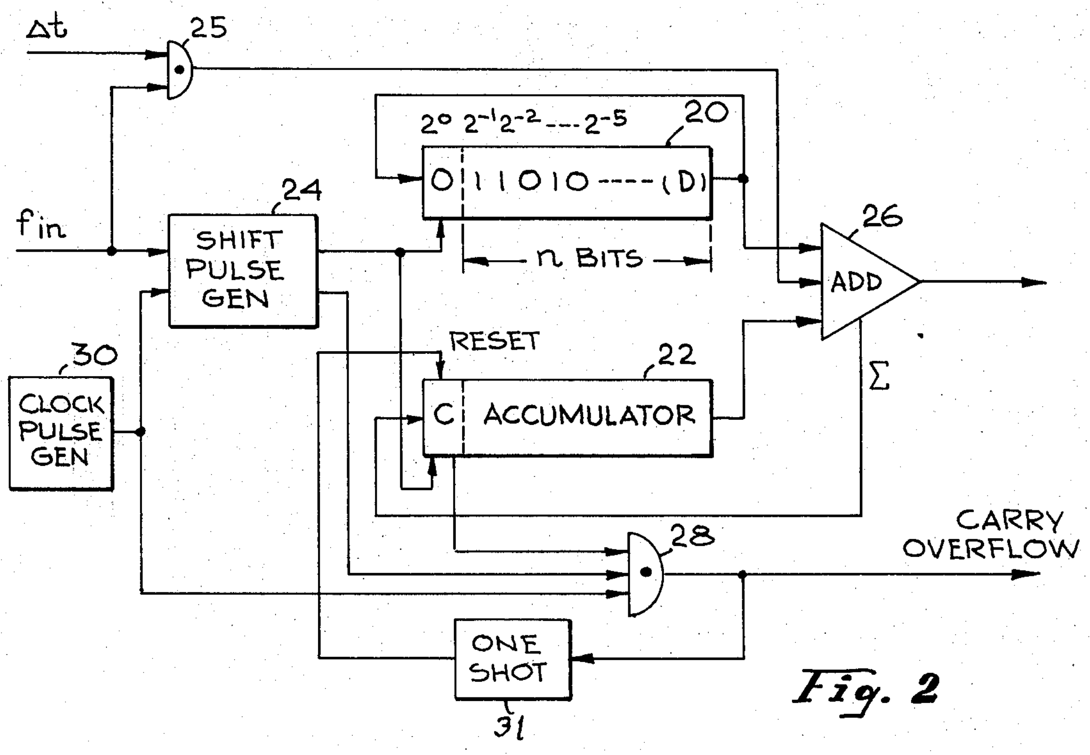
FIG. 2 is a block diagram illustrating how an overflow bit may be taken from the most significant bit position of the accumulator, in accordance with this invention.

FIG. 2 is a block schematic diagram showing, in accordance with this invention, how an overflow bit may be taken from the most significant bit position, of the accumulator. The DDI includes an integrand register 20, and an accumulator 22, a shift pulse generator 24, and an adder 26, all arranged in the same manner, as in FIG. 1. The difference here is in the location from which the carry overflow bit C is taken. As shown in FIG. 2, it is taken from the most significant bit location of the accumulator register, which is given one extra stage to provide for the carry overflow bit. The integrand register is also given one extra stage. The sum output of the adder is entered into the accumulator through the carry overflow bit stage. For every "$f_{in}$" pulse the shift pulse generator 24 is initiated. If an iteration should be performed the $\Delta t$ line is qualified too. As a result, AND gate 25 goes high enabling the output of the integrand 20 to be entered into the input of the adder 26.

Figure 3:
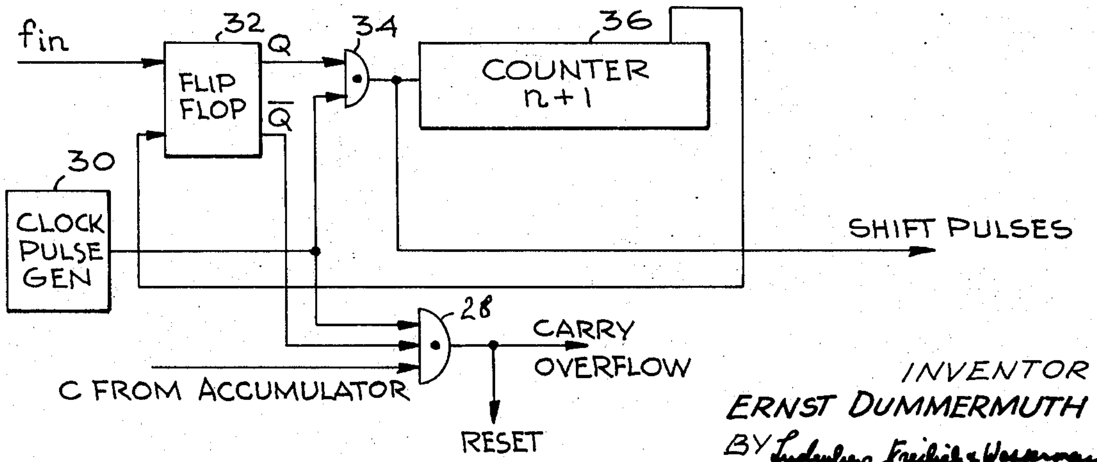
FIG. 3 is a block schematic diagram illustrating in greater detail a portion of the circuit arrangement shown in FIG. 2.

At the end of each iteration after removing the overflow bit, the carry overflow bit stage is reset to zero. Circuitry for transferring the carry overflow bit at the end of each iteration and resetting the carry overflow bit stage to zero, includes an AND gate 28 which has one input connected to the stage C of the accumulator, a second input is received from a clock pulse generator 30, and a third input is derived from an output from the shift pulse generator 24. The location of this output from the shift pulse generator is shown in FIG. 3, which will be described subsequently hereunder. The output of AND gate 28 is applied to a delayed one shot circuit 31, the output of which resets the carry overflow stage C, after the contents have been transferred out.

FIG. 3 shows the details of the shift pulse generator. The $f_{in}$ pulse sets a flip-flop 32. The flip-flop output is applied to an AND gate 34 which has as its other input the output of the clock pulse generator 30. The flip-flop output enables the AND gate 34 to apply clock pulses to an $n+1$ counter 36, and also to both the integrand and accumulator registers as shift pulses. When the $n+1$ counter reaches its final count, $n+1$, it resets the flip-flop thus terminating the shift pulses. The reset output of the flip-flop 32 is applied to the AND gate 28 as well as a clock pulse whereby the AND gate can then pass a carry overflow bit if there is one in the C stage of the accumulator. The carry overflow pulse (delayed) is also used to reset the C stage.

Note that the integrand register is made to have $n+1$ bits to equal the length of the accumulator register (because of the overflow bit C), if the integrand always preserves a 0 in the most significant bit position, its effective length is $n$ bits and $2^n$ iterations are required to produce X pulses.

The assignment of the negative powers of 2 to the bit positions in the integrand causes the DDI to operate as a binary rate multiplier. Serial binary arithmetic is employed so that the integrand and accumulator may be built from shift registers.

Instead of using the single most significant bit for carry overflow, two or more of the most significant bits, treated as a binary number, may be read out of the accumulator as carry overflow. Reproduced below are tables which illustrate the interpolation process wherein column "A" illustrates the contents of the accumulator for a conventional DDI rate multiplier showing 16 iterations to produce 12 overflow pulses, using a single bit carry overflow.

The number shown in each column under "C" and under "Accum," adjacent each iteration step represents the number in the overflow bit position and in the remainder of the accumulator register at the conclusion of that iteration step. The number immediately below the one just described is what remains in the ac-

TABLE 1

Gain in excess of 1.0

(Integrand 0 1 1 0 0)

| Iteration Step | A C Accum | B C Accum | C C Accum |
|---|---|---|---|
| 0 | 00000 | 00000 | 00000 |
| | 00000 | 00000 | 00000 |
| 1 | 01100 | 01100 | 01100 |
| | 01100 | 00100 | 00000 |
| 2 | 11000 | 10000 | 01100 |
| | 01000 | 00000 | 00000 |
| 3 | 10100 | 01100 | 01100 |
| | 00100 | 00100 | 00000 |
| 4 | **10000** | 10000 | 01100 |
| | **00000** | **00000** | 00000 |
| 5 | 01100 | 01100 | 01100 |
| | 01100 | 00100 | 00000 |
| 6 | 11000 | 10000 | 01100 |
| | 01000 | 00000 | 00000 |
| 7 | 10100 | 01100 | 01100 |
| | 00100 | 00100 | 00000 |
| 8 | 10000 | 10000 | 01100 |
| | 00000 | 00000 | 00000 |
| 9 | 01100 | 01100 | 01100 |
| | 01100 | 00100 | 00000 |
| 10 | 11000 | 10000 | 01100 |
| | 01000 | 00000 | 00000 |
| 11 | 10100 | 01100 | 01100 |
| | 00100 | 00100 | 00000 |
| 12 | 10000 | 10000 | 01100 |
| | 00000 | 00000 | 00000 |
| 13 | 01100 | 01100 | 01100 |
| | 01100 | 00100 | 00000 |
| 14 | 11000 | 10000 | 01100 |
| | 01000 | 00000 | 00000 |
| 15 | 10100 | 01100 | 01100 |
| | 00100 | 00100 | 00000 |
| 16 | 10000 | 10000 | 01100 |
| | Output: 12 | Output: 24 | Output: 48 |

TABLE 2

Loss of smoothing stages (Integrand 0 1 1 0 0)

| A C Accum | B C Accum | C C Accum |
|---|---|---|
| 00000 | 00000 | 00000 |
| 00000 | | |
| 01100 | 00000 | |
| 01100 | | |
| 11000 | 01100 | 00000 |
| 01000 | | |
| 10100 | 00100 | |
| 00100 | | |
| 10000 | 10000 | 01100 |
| **00000** | | |
| 01100 | 00000 | |
| 01100 | | |
| 11000 | 01100 | 00000 |
| 01000 | | |
| **10100** | **00100** | |
| **00100** | | |
| 10000 | 10000 | 01100 |
| 00000 | | |
| 01100 | 00000 | |
| 01100 | | |
| 11000 | 01100 | **00000** |
| 01000 | | |
| 10100 | 00100 | |
| 00100 | | |
| 10000 | 10000 | 01100 |
| 00000 | | |
| 01100 | 00000 | |
| 01100 | | |
| 11000 | 01100 | 00000 |
| 01000 | | |
| 10100 | 00100 | |
| 00100 | | |
| 10000 | 10000 | 01100 |
| Output: 12 | Output: 12 | Output: 12 |

cumulator after the overflow bit or bits position has been reset to 0. To this latter number is added 01100 in the process of the next iteration so that the number shown adjacent the next iteration step is the sum of the two.

Column B in Table I illustrates what can be accomplished by using the carry bit and the most significant bit of the accumulator as an integral part of R, i.e., a two bit binary number, this number specifies the number of increments to be processed per iteration. 24 increments are obtained for only 16 iterations achieving a gain of two, as compared to column A. Column C is an illustration of a three bit overflow producing a total of 48 increments, as compared to 12 increments of column A, achieving a gain of 4. It should be noted that the iteration rate of $f_{in}$ for A, B and C is constant. If an output of 12 only is only desired fro the DDI operating in accordance with column B, then one-half the iteration rate of column A can be employed. Likewise, the structure of Column C can generate an output of 12 if iterated at one-quarter the rate of A. This fact is illustrated in Table 2. Each time an additional bit is taken as a carry overflow, the iteration rate is reduced by a factor of 2.

To summarize, Column A shows what occurs with a single bit carry overflow. Column B shows what happens with a two bit carry overflow and Column C shows what happens with a three bit carry overflow. The integrand in all cases is 01100.

Table 2 illustrates a loss of smoothing stages by maintaining a constant output. For each additional overflow bit the iteration frequency is reduced by a factor of 2.

By comparing columns A and C of Table 2 it can be seen that three overflow pulses in column A are combined and outputted at once in column C. Taking multiple overflows as output and reducing the iteration rate accordingly does not change the total number of increments outputted, however, it changes the pulse distribution. Essentially, it looks like the loss of smoothing stages and the continuous pulse train of column A is modified such that a group of overflow pulses are clustered together and outputted together in the form of a binary number.

Figure 4:
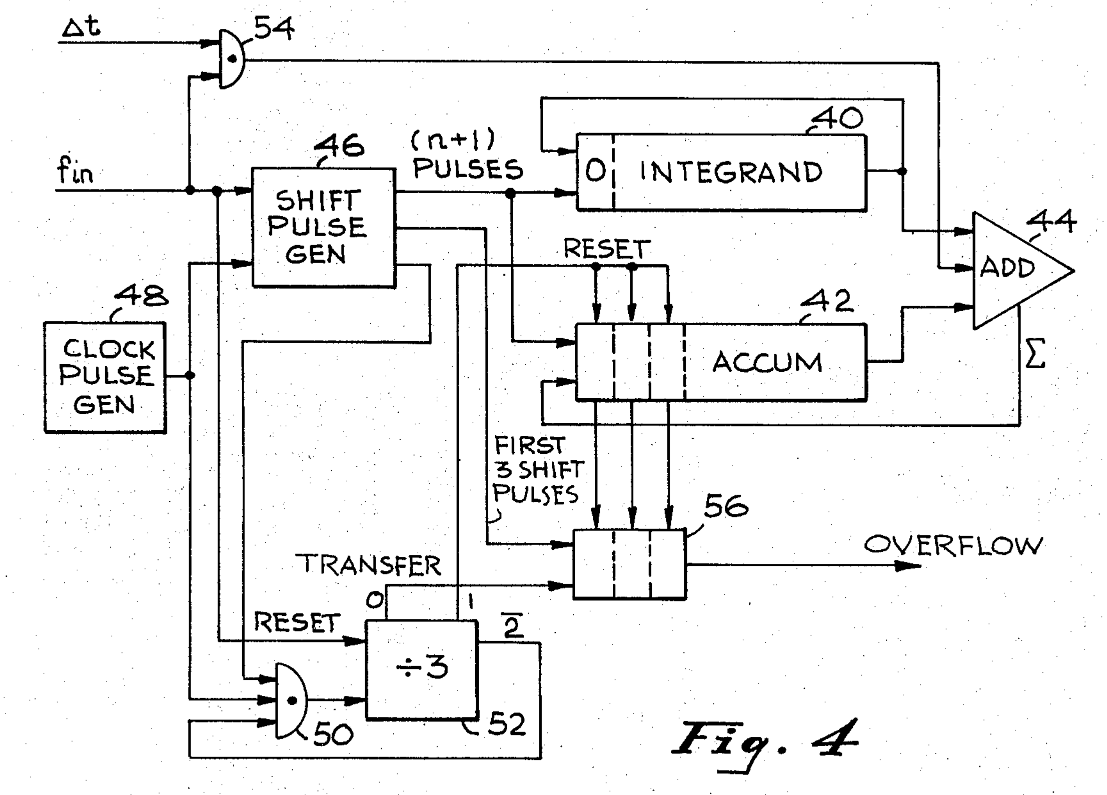
FIG. 4 is a block schematic diagram of another embodiment of this invention.

Reference is now made to FIG. 4 which illustrates an embodiment of the invention wherein overflow is taken from the three most significant bit stages of the accumulator. Essentially, the construction is the same as that shown in FIG. 2 except for the number of bit stages from which the overflow is taken. The DDI includes an integrand shift register 40 and an accumulator shift register 42, each of the shift registers are connected from the least significant bit ends to an adder 44. The sum output of the adder is entered into the accumulator 42 through the most significant bit position. The output of the integrand to the adder is recirculated back to the most significant bit position. Iteration pulses $f_{in}$ are applied to a 3 counter 52 and to a shift pulse generator 46, which may have the same construction as shown in FIG. 3. Also applied to the shift pulse generator are clock pulses from a clock pulse generator 48.

At the conclusion of an iteration, an output is taken from the shift pulse generator, similar to the location of the output from flip-flop 32 shown in FIG. 3. This output, together with the output from the clock pulse generator 48 is applied to an AND gate 50. The output of the AND gate, which now consists of clock pulses, is applied to a three count counter 52 which has been reset from $f_{in}$. The first pulse from AND gate 50 transfers the most significant three bits of the accumulator 42 to the buffer 56 and steps the counter 52 from count 0 to 1. The second pulse from NAND gate 50 causes the counter to reset the most significant three bits of the accumulator 42 and then steps the counter to count 2. The output of count stage 2 is fed back to gate 50 to disable further clock pulses.

The three bits in the buffer 56 are now transfered out as an overflow binary number. A very convenient way to transfer out these three bits is to use the first three shift pulses of the next cycle to unload buffer 56. Note that $f_{in}$ occurs at constant time intervals and that $\Delta t$ determines if an addition should be performed Both signals $f_{in}$ and $\Delta t$ are applied to AND gate 54 and its output qualifies the adder 44 to accept the integrand 40 as its second data input.

Figure 5:
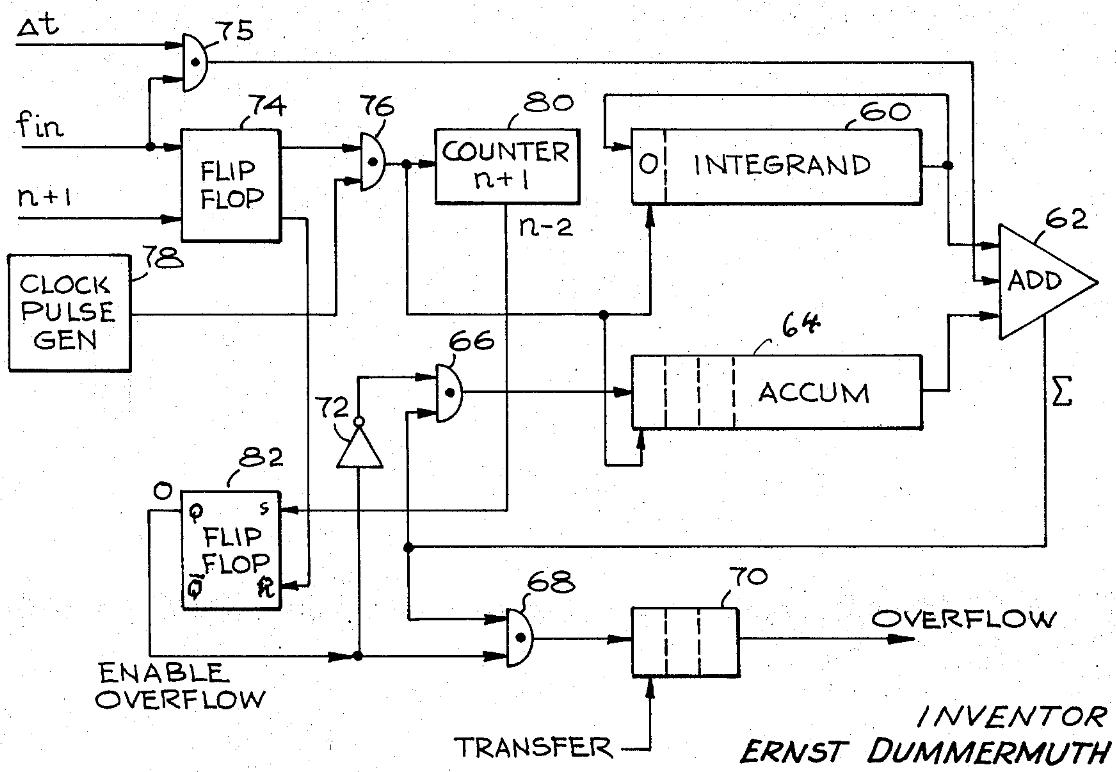
FIG. 5 is a block schematic diagram of still another embodiment of this invention.

FIG. 5 shows another embodiment of the invention. This includes an integrand register 60, an adder 62, and an accumulator register 64. The output of the integrand is circulated back through its most significant bit position. The sum output of the adder 62 is applied to two AND gates respectively 66, 68. The output of AND gate 68 is entered into a register 70.

A second input to AND gate 66 is the output of an inverter circuit 72.

The shift pulse generator includes a flip-flop 74, which is driven to its set state by the $f_{in}$ pulse. The output of the flip-flop 74 when in its set state, enables an AND gate 76. The AND gate can then pass clock pulses from a clock pulse generator 78 to an $n+1$ counter 80. The $n+1$ output of the $n+1$ counter resets flip-flop 74. The $n-2$ output of the counter 80 causes a flip-flop 82 to be set. The set output of flip-flop 82 constitutes an enable overflow signal. If a $\Delta t$ input is present at AND gate 75 then its output qualifies the adder to accept the integrand 60 as a second data input.

During the iteration process, the output of the inhibit circuit 72 enables AND gate 66 whereby the sum output of the adder is entered into the accumulator. Upon the occurrence of the $n-2$ count of counter 80, flip-flop 82 is set whereby its output is applied to inverter 72 and AND gate 68. The AND gate 66 will then be disabled while AND gate 68 will be enabled. As a result, the next three outputs of the adder 62 are entered into the register 70. The three most significant bit positions of the accumulator 64 will therefore automatically become zeros, as the rest of the accumulator contents are shifted toward the least significant bit position.

At the end of the iteration, flip-flop 74 is reset by the $n+1$ output of the counter. Its reset output is applied to reset flip-flop 82. The output of the register 70 can then be transferred out as overflow in response to transfer pulses. The transfer pulses may be derived from a transfer pulse source, or the first three shift pulses applied to the DDI may be used as transfer pulses.

Figure 6:
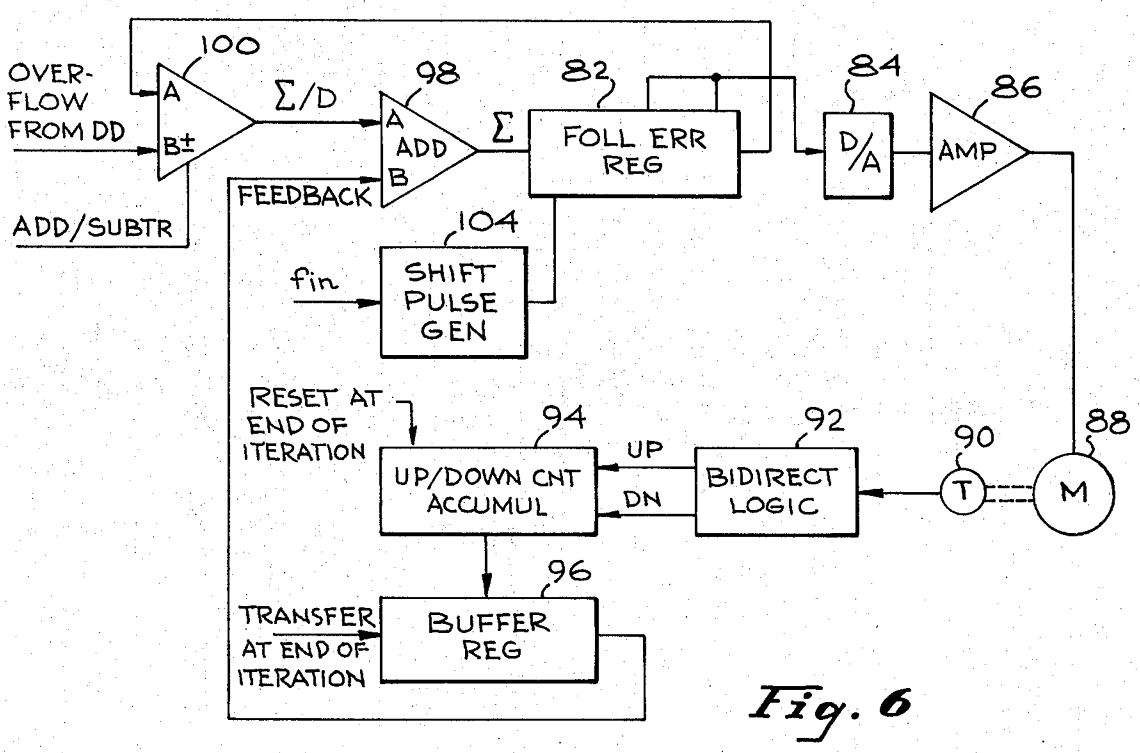
FIG. 6 illustrates how the output of an embodiment of this invention may be used with a numerical machine tool control arrangement.

FIG. 6 is a block schematic diagram illustrating how the binary digital overflow from a DDI may be used with the servo system employed to drive a machine tool. The circuitry for only one axis is shown. It will be appreciated that the circuitry must be duplicated for each axis of the machine tool which is desired to be controlled.

In the conventional case, a single bit overflow from a DDI is applied to a stepping motor or a phase modulator to be used in conjunction with a resolver feedback. These applications are well known. By using pulse transducer feedback from the driving motor, D to A techniques can be used to derive the drive signal for closed loop servo systems. In a conventional case, a register is provided which stores the following error. This register is initially reset and then is incremented for every overflow pulse obtained from a DDI. It is also decremented for every feedback pulse obtained from the transducer driven from the motor. The contents of the register is applied to a D to A converter to obtain an analog drive signal.

In accordance with this invention, a following error register 82, comprises a serial shift register with a recirculation rate equal to the iteration rate of the DDI's. Instead of incrementing the following error, the binary number generated in the overflow bits of the DDI is algebraically added to the contents of this register. Similarly, the feedback pulses from the transducer may also be accumulated over an iteration interval and algebraically subtracted from the register. It should be noted that the iteration rate of the DDI can be much lower than the rate of feedback pulses obtained from the transducer.

The contents of the following error register are applied to a D to A converter 84. The output of the D to A converter drives an amplifier 86, which in turn is used to drive a motor 88. A transducer 90, drives a bidirectional logic circuit 92, whose output is applied to either increase or decrease the total accumulated in an up/down counter 94. The contents of the up/down counter are automatically entered into a buffer register 96. At the end of an iteration cycle the contents of the buffer register 96 are fed serially as one input to an adder 98. The other input to this adder is the output of a preceding adder 100. This adder receives as one input the command output of a DDI arrangement such as shown in FIG. 5, and the other input is the output of the following register 82. This is shifted into the adder/subtractor 100 in response to a pulse signal occurring at the end of the iteration which causes a shift pulse generator 104 to commence applying the number of shift pulses required for the following error register to shift its contents serially through the adder 100.

It should be noted that due regard for the polarity of the command signal being received by the adder/subtractor 100 from the DDI overflow is taken into consideration by a signal which indicates whether to add the command overflow to the following error register or to subtract it. The polarity of the feedback binary digital number, as determined by the direction of rotation of the motor 88, is taken into consideration, too. However since the up/down counter produces negative numbers in two's complement form, no special sign control line is needed. The output of adder 98 is entered into the following error register through its most significant bit position.

The operation of the servo loop shown should be apparent from the description thus far. During an iteration interval, the contents of the following error register are converted from a digital number into an analog signal which is employed to drive the motor 88. The motor drives the transducer, which provides pulses indicative of the increment of motion through which the motor has turned and driven the machine tool table. The number accumulated in the up/down counter including the sign indicate the direction of motion. When an iteration interval terminates, the following error register commences to shift its contents through the add circuit 100 which simultaneously receives the overflow number from the DDI. The adder circuit 100 adds these two numbers serially, least significant bit first in the sum output as applied to the adder circuit 98. This circuit adds serially the output of the adding circuit 100 with the output of the buffer register 96 least significant bit first. The output of the adder circuit 98 is shifted into the following error register 82 taking the place of the number which was shifted out of it into the adder circuit 100. All this is accomplished during the next iteration cycle of the DDI. The system then operates to drive the motor 88 with the number in the following error register.

The circuits represented by the block diagrams in FIG. 6 are well known and thus their details need not be provided.

The concept shown in hardware form in FIG. 5 may also be implemented using a general purpose computer and a software program. Table 3 shown below gives a list of the instructions to accomplish interpolation. Similar instructions must be provided for additional axes.

Upon the occurrence of a real time interrupt signal, the computer abandons the program it is then conducting and jumps to the interpolation sub-routine, and upon completion, can return control to the main program. The execution time for the interpolation sub-routine must be considerably shorter than an interrupt interval to allocate time for "off-line" tasks. The application of the multiple overflow concept considerably increases the number of operations which can be accomplished in the interrupt interval. Each additional overflow bit increases available time within the interrupt interval by a factor of 2. Assume a program which allows 10 overflow bits. Then this is the same as increasing the interrupt interval by a factor of 1,024 ($2^{10}$) as compared to a single bit overflow. As a result, the frequency of the real time interrupt is down by a factor of 1,024.

Computer Instructions For Software Implementation of a DDI with a Three Bit Overflow

| Instructions | Comments |
|---|---|
| Load X Integr. | Call X Integr from core |
| Add X Accum | Call X Accum. from core and add to X Integr. |
| Store Temporary | Save updated sum in Temporary Storage |
| And V | V is a constant containing logic 1's in the highest three bit positions; generates overflow through a logic and function |
| Store Overflow | Save overflow for servo purpose |
| Load Temporary | Recall updated sum |
| And W | W is a constant containing logic 0's in the highest three bit position; generates remainder through the logic and function |
| Store X Accum. | Save remainder for next iteration |

Figure 7:
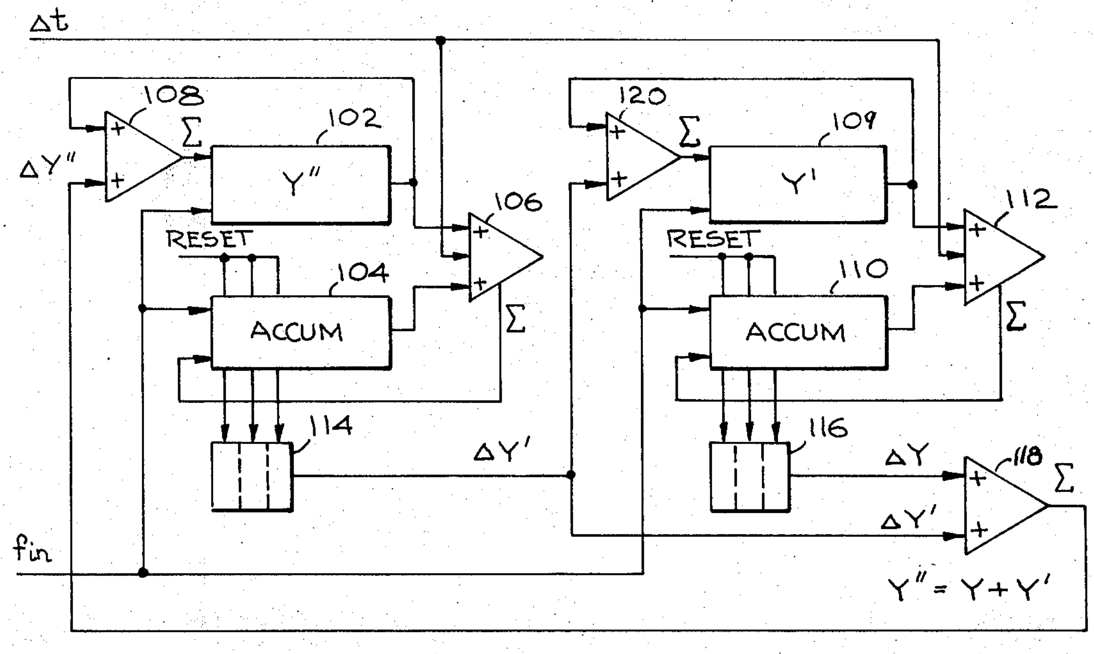
FIG. 7 illustrates how the embodiment of this invention may be used to solve the differential equation $Y''=Y+Y'$.

The Technique of multiple overflow for a DDI, which has been described, may be employed for other purposes than those indicated hereinabove. They may be used in solving differential equations somewhat similar to the arrangements used heretofore with the DDI's. However, the principal of multiple bit overflow can be used to reduce computation time at the expense of some reduction in accuracy. For example, FIG. 7 shows an arrangement for solving the differential equation $Y''=Y+Y'$. Two DDI's are shown. The first DDI has an integrand register 102, an accumulator register 104, and an adder 106. The second DDI has an integrand register 109, an accumulator register 110, and an adder 112. The three bit overflow is used here; Accordingly a three bit register 114 is used with the accumulator 104 to hold the three most significant bits, and the three bit register 116 is used with the accumulator 110 to hold its three most significant bits. The iteration frequency and the shift frequency which is applied to both DDI's, is the same, and is designated as $f_{in}$. The output of the first integrand register 102, (designated as Y'',) besides being applied to the adder 106 is also applied to an adder 108, whose second input is the output of adder 118. The buffer register 114 is designated as ΔY', is one input to an adder 120, whose other input is the output of the integrand 109. The output of the buffer register 116 is applied as an input to the adder 118.

Both DDI's function in the manner previously described to shift their integrand and accumulator register inputs into their respective adders 106 and 112 with the sums being entered into the respective accumulators 104 and 110. At the end of one iteration cycle the buffer register 114 contains the change ΔY' which will be used to modify the Y' integrand 109 and the buffer register 116 contains the change ΔY. Both changes ΔY' and ΔY are added in adder 118 and comprise the change ΔY'' to be used to modify the Y'' integrand 102.

There has accordingly been described and shown hereinabove a novel, and useful arrangement for a digital differential integrator circuit employing multiple overflow bits.

What is claimed is:

1. In a digital differential integrator of the type wherein there is an adder, an integrand register and an accumulator register, and during each iteration said integrand register and accumulator register have their contents shifted from the least significant bit positions serially into said adder to be added, said shift occurring a number of times determined by the length of said registers, and the integrand register contents are circulated back through its most significant bit position while being shifted into said adder, and the adder sum is shifted into said accumulator register through its most significant bit position, the improvement comprising:

means for deriving as carry overflow a multibit binary number comprising a predetermined plurality of the most significant bits of the adder sum being entered into said accumulator register for each completion of the shift of the integrand and accumulator register contents through said adder, and means for resetting the most significant bit positions of said accumulator register assigned for occupation by said predetermined plurality of significant bits.

2. In a digital differential integrator as recited in claim 1 wherein said means for deriving as carry overflow one or more of the most significant bits of the adder sum being entered into said accumulator register for each completion of the shift of the integrand and accumulator register contents through said adder comprises:

a buffer register having as many bit positions as are in said carry overflow, means for transferring to said buffer register the contents of the one or more most significant bit positions of said accumulator register holding said carry overflow bits at each completion of the shift of the contents of the integrand and accumulator registers to said adder.

3. In a digital differential integrator as recited in claim 1 wherein said means for deriving as carry overflow one or more of the most significant bits of the adder sum being entered into said accumulator register for each completion of the shift of the integrand and accumulator register contents through said adder comprises:

a buffer register having as many bit positions as are in said carry overflow, gate means for directing during each iteration the one or more significant bits in the output of said adder into said buffer register and the remainder of the output of said adder into said accumulator register.

4. Apparatus as recited in claim 3 wherein said gate means includes a first and a second gate means, means coupling the output of said adder to one input of said first and second gate means, means coupling the output of said first gate means to the most significant bit stage of said accumulator register, means coupling the output of said second gate means to the most significant stage of said buffer register, and means for enabling said first gate means and disenabling said second gate means until the least significant bit of said one or more significant bits appears at the output of said adder when said first gate means is disenabled and said second gate means is enabled.

5. In a digital differential integrator of the type wherein there is an adder, an integrand register and an accumulator register, and during each iteration said integrand register and accumulator register have their contents shifted from the least significant bit positions serially into said adder, said shift occurring a number of times determined by the length of said registers, and the integrand register contents are circulated back through its most significant bit position while being shifted into said adder, and the adder sum is shifted into said accumulator register through its most significant bit position, the improvement comprising:

means for deriving carry overflow in the form of a multibit binary number from a predetermined plurality of the most significant bit positions of said accumulator register upon each completion of the shift of the contents of the integrand and accumulator registers through said adder, and means for resetting said accumulator most significant bit positions from which said carry overflow has been derived prior to commencing the next shift of integrand and accumulator contents into said adder.

6. In a digital differential integrator as recited in claim 5 wherein said means for deriving carry overflow from one or more of the most significant bit positions of said accumulator register includes a buffer register, and means for transferring the contents of said one or more most significant bit positions of said accumulator register into said buffer register upon each completion of a shift of the contents of said accumulator and integrand register into said adder.

7. A digital differential integrator having an adder means, an integrand register, an accumulator register, means for shifting serially the contents of said integrand and accumulator registers from the least significant bit stages into said adder means to be added, means for circulating the contents of said integrand register which are being shifted from its least significant bit position to its most significant bit position, means for inserting the sum output of said adder means into said accumulator register through its most significant bit position, means for deriving a carry overflow output from one or more of the most significant bit stages of said accumulator register at the end of the addition by said adder means of the integrand and accumulator registers, and means for resetting the accumulator stages from which carry overflow has been derived.

8. A digital differential integrator having an adder means, an integrand register, an accumulator register, means for shifting serially the contents of said integrand and accumulator registers from the least significant bit stages into said adder means to be added, means for circulating the contents of said integrand register which are being shifted from its least significant bit positions to its most significant bit position, a buffer register, and gate means for inserting all of the sum output of said adder means into said accumulator register through its most significant bit position except for a predetermined number of the most significant bits in said sum which are inserted by said gate means into said buffer register.

9. Apparatus as recited in claim 8 wherein said gate means includes a first and second gate means, means coupling the output of said adder to one input of said first and second gate means, means coupling the output of said first gate means to the most significant digit stage of said accumulator register, means coupling the output of said second gate means to the most significant stage of said buffer register, and means for enabling said first gate means and disenabling said second gate means until the least significant bit of said one or more significant bits appeals at the output of said adder when said first gate means is disenabled and said second gate means is enabled.

10. In a numerical control machine tool system of the type wherein the distance a machine tool table is to move along an axis is established by a motion command number which is converted into a motion command pulse train by a digital differential integrator circuit, said motion command pulse train being applied to a following error register, the output of which is used to drive a motor which moves the machine tool table, a feedback transducer converts the machine tool table motion into pulses which are then applied to the error register to reduce the contents established therein by said motion command pulse train, the improvement comprising, means for periodically deriving from said digital differential integrator circuit a carry overflow in the form of a several bit long binary number, means for accumulating the output of said feedback transducer over the interval between derivations of said carry overflow from said digital differential integrator, means for algebraically adding said binary number to the contents of said following error register to produce a first sum, means for algebraically adding said first sum with the accumulated output of said feedback transducer to produce a second sum, means for entering said second sum into said following error register, digital to analog converter means to which said following error register contents are applied for converting them to an analog signal, and motor means responsive to said analog signal to drive said machine tool table along an axis of motion.

11. An automated method using a computer having a memory and a temporary store, said computer operating as a digital differential integrator with an n bit overflow, wherein the computer performs the following steps:

deriving an X integrand number from memory, deriving an X accumulator number from memory, adding said X integrand and X accumulator numbers to provide a sum, storing in memory said sum numbers, reading said sum from memory into temporary storage, transferring out from temporary storage the n most significant bits of said sum as carry overflow bits, transferring out from temporary storage all but the *n* most significant bits of said sum to provide an updated X accumulator number, and storing said updated X accumulator number in memory in place of said X accumulator number.

12. The automated method recited in claim 11 wherein the step of transferring out from temporary store the n most significant bits of the sum stored in said temporary store as carry overflow bits includes generating an "AND" function of "1" bits together with each of said n most significant bits to produce carry overflow bits which are duplicates, and wherein the step of transferring out from said temporary store said updated X accumulator number includes generating an "AND" function of "1" bits with each of the bits of the number in said temporary store except said *n* most significant bits to transfer out said updated X accumulator number.

* * * * *